(12) United States Patent
Smith

(10) Patent No.: US 9,712,330 B2
(45) Date of Patent: Jul. 18, 2017

(54) PHYSICALLY UNCLONEABLE FUNCTION DEVICE USING MRAM

(71) Applicant: Honeywell International Inc., Morristown, NJ (US)

(72) Inventor: Michael A. Smith, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 291 days.

(21) Appl. No.: 14/570,910

(22) Filed: Dec. 15, 2014

(65) Prior Publication Data

US 2016/0173289 A1 Jun. 16, 2016

(51) Int. Cl.
| | | |
|---|---|---|
| *H04L 9/32* | (2006.01) | |
| *G06F 13/16* | (2006.01) | |
| *G09C 1/00* | (2006.01) | |
| *G11C 8/12* | (2006.01) | |
| *G11C 11/16* | (2006.01) | |
| *G11C 29/44* | (2006.01) | |

(52) U.S. Cl.
CPC ........ *H04L 9/3278* (2013.01); *G06F 13/1636* (2013.01); *G06F 13/1689* (2013.01); *G09C 1/00* (2013.01); *G11C 11/1695* (2013.01); *G11C 8/12* (2013.01); *G11C 11/165* (2013.01); *G11C 2029/4402* (2013.01)

(58) Field of Classification Search
CPC .................................................... H04L 9/3278
See application file for complete search history.

(56) References Cited

U.S. PATENT DOCUMENTS

| | | | | |
|---|---|---|---|---|
| 7,898,283 | B1* | 3/2011 | Koushanfar | ............ G06F 21/72 326/47 |
| 8,290,150 | B2 | 10/2012 | Erhart et al. | |
| 8,525,169 | B1 | 9/2013 | Edelstein et al. | |
| 9,171,144 | B2* | 10/2015 | Lewis | ........................ G06F 21/70 |
| 2002/0188857 | A1 | 12/2002 | Orlando et al. | |
| 2010/0199103 | A1 | 8/2010 | Van Rijnswou | |
| 2011/0055781 | A1 | 3/2011 | Potkonjak | |
| 2011/0239002 | A1* | 9/2011 | Beckmann | ............... G06F 9/455 713/189 |
| 2013/0082733 | A1* | 4/2013 | Shimizu | ............... H03K 19/003 326/8 |
| 2013/0129083 | A1 | 5/2013 | Fujino | |

(Continued)

FOREIGN PATENT DOCUMENTS

| | | |
|---|---|---|
| CN | 103778374 A | 5/2014 |
| CN | 103839013 A | 6/2014 |

OTHER PUBLICATIONS

Anderson, J.M., "Anti-Tamper MRAM-Based Physical Unclonable Functions (PUF) for FPGA Security," Office of the Secretary of Defense, OSD10-A02, Dec. 20, 2010, 3 pp.

(Continued)

*Primary Examiner* — Glenn A Auve
(74) *Attorney, Agent, or Firm* — Shumaker & Sieffert, P.A.

(57) ABSTRACT

In some examples, a first delay path and a second delay path may each be configured to receive a signal as an input signal at the same time, propagate the input a plurality of MRAM cells, and output the propagated input signal for an arbiter. The arbiter may be configured to output a response value based at least in part on a relative order of arrival of the propagated input signals from the first and second delay paths.

17 Claims, 4 Drawing Sheets

(56) References Cited

U.S. PATENT DOCUMENTS

| | | | |
|---|---|---|---|
| 2013/0202107 A1* | 8/2013 | Danger | G01R 31/31719 380/44 |
| 2014/0103286 A1 | 4/2014 | Chu et al. | |
| 2014/0108786 A1 | 4/2014 | Kreft | |
| 2014/0126306 A1 | 5/2014 | Otterstedt et al. | |
| 2014/0159040 A1 | 6/2014 | Dimitrakopoulos et al. | |
| 2015/0071432 A1* | 3/2015 | Zhu | G11C 11/1673 380/28 |

OTHER PUBLICATIONS

Che et al., "A Non-Volatile Memory based Physically Unclonable Function without Helper Data," Proceedings of the 2014 IEEE/ACM International Conference on Computer-Aided Design, ICCAD '14, Nov. 2-6, 2014, 6 pp.

* cited by examiner

PHYSICALLY UNCLONEABLE FUNCTION DEVICE USING MRAM

TECHNICAL FIELD

This disclosure relates to a physically uncloneable function device.

BACKGROUND

A physically uncloneable function (PUF) device is a hardware device that is embedded or otherwise included in an electrical circuit and can be used to identify and authenticate the electrical circuit for secure computing applications. A device can perform a physically uncloneable function, and therefore be deemed a PUF device, if given a challenge input, the device produces an unpredictable but repeatable response output. The physically uncloneable function may be unique for each instance of the PUF device, such that the challenge-response behavior of the PUF device is difficult if not impossible to clone even if other devices with identical layouts are manufactured using an identical process as the PUF device.

SUMMARY

In some aspects, the disclosure describes example devices, systems, and techniques for identifying and authenticating an electrical circuit for secure computing applications using a PUF device. The PUF device may produce a unique set of challenge-response pairs for the electrical circuit which may identify the electrical circuit. The PUF device may be tested against the unique set of challenge-response pairs to authenticate the electrical circuit.

In one example, the disclosure is directed to a device comprising: a first delay path including a first plurality of magnetoresistive random access memory (MRAM) bits in series, wherein the first path is configured to: receive a signal as a first input signal, propagate the first input signal along the first plurality of MRAM cells, and output the propagated first input signal as a first output signal for an arbiter; and a second delay path including a second plurality of MRAM cells in series, wherein the second path is configured to: receive the signal as a second input signal, propagate the second input signal along the second plurality of MRAM cells, and output the propagated second signal as a second output signal for the arbiter; wherein the arbiter is operably coupled to the first delay path and the second delay path, and wherein the arbiter device is configured to output a response value based at least in part on a relative propagation delay of the first output signal and the second output signal.

In another example, the disclosure is directed to a device comprising: an integrated circuit; and a plurality of delay chains disposed over at least a portion of the integrated circuit, wherein each of the plurality of delay chains include a pair of delay paths, the pair of delay paths including: a first delay path including a first plurality of magnetoresistive random access memory (MRAM) bits in series, wherein the first path is configured to: receive a signal as a first input signal, propagate the first input signal along the first plurality of MRAM cells, and output the propagated firs input signal as a first output signal for an arbiter; and a second delay path including a second plurality of MRAM cells in series, wherein the second path is configured to: receive the signal as a second input signal, propagate the second input signal along the second plurality of MRAM cells, and output the propagated second signal as a second output signal for the arbiter; wherein the arbiter is operably coupled to the first delay path and the second delay path, and wherein the arbiter device is configured to output a response value based at least in part on a relative propagation delay of the first output signal and the second output signal.

In another example, the disclosure is directed to a method comprising: receiving, by a first delay path including a first plurality of magnetoresistive random access memory (MRAM) bits in series, a signal as a first input signal, propagating, by the first delay path, the first input signal along the first plurality of MRAM cells; outputting, by the first delay path, the propagated first input signal as a first output signal for an arbiter; receiving, by a second delay path including a second plurality of MRAM cells in series, the signal as a second input signal; propagating, by the second delay path, the second input signal along the second plurality of MRAM cells; outputting, by the second delay path, the propagated second input signal as a second output signal for the arbiter unit; and outputting, by the arbiter unit operably coupled to the first delay path and the second delay path, an output value based at least in part on a relative propagation delay of the first output signal and the second output signal.

The details of one or more examples are set forth in the accompanying drawings and the description below. Other features, objects, and advantages in addition to those described below will be apparent from the description and drawings, and from the claims.

DETAILED DESCRIPTION

Figure 1:
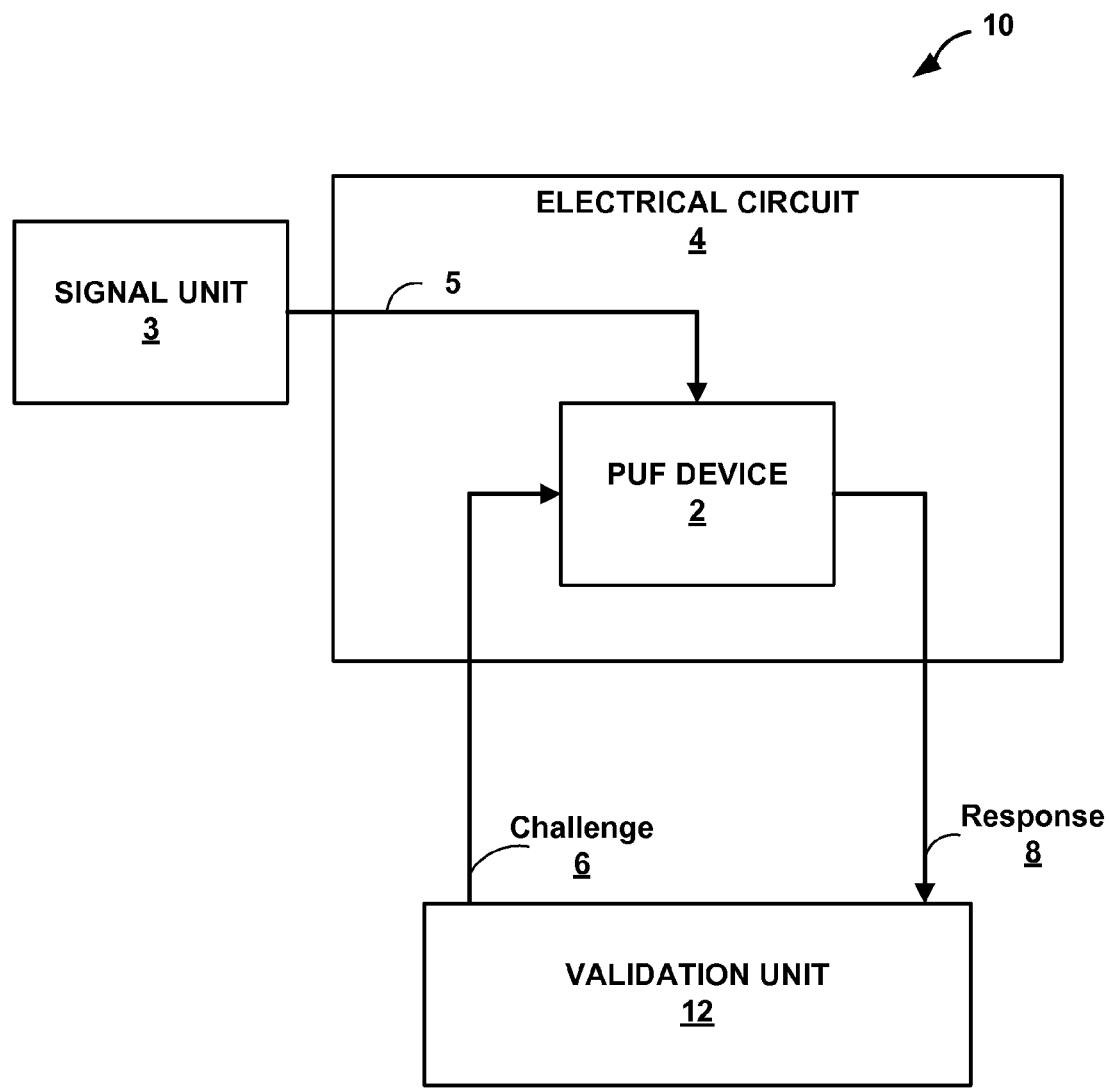
FIG. 1 is a block diagram illustrating an example system in which an example PUF device may be configured to authenticate and identify an example electrical circuit 4.

One example of a PUF device is a PUF delay circuit or delay path, where given a set of challenge inputs that represent a sequence of bits (i.e., a sequence of 1's and 0's), the PUF device produces a response output based upon the delay in propagating a rising edge signal through the PUF device. The PUF device may include a pair of delay paths, where each delay path includes a series of magnetoresistive random access memory (MRAM) cells in series with a series of capacitors. The PUF device may apply the set of challenge inputs to the series of MRAM cells of the pair of delay paths. The PUF device may include an arbiter that determines a response, such as an output representative of a '1' or an output representative of a '0', based at least in part upon which of the delay paths is first to propagate the rising edge signal to the arbiter. In some examples, the PUF device may include an array of pairs of delay paths, such that arbiters associated with respective pairs of delay paths may output a respective response, and, together, the responses include a string of 1's and 0's.

Due to the resistive nature of MRAM cells as well as manufacturing variances of the MRAM cells and the capacitors, the time required for the pair of delay paths to each propagate the rising edge signal through the delay paths may vary. An MRAM cell can be in one of two states: low resistance and high resistance. For example, an MRAM cell can be set to a high resistance state to store a '1' and can be set to a low resistance state to store a '0'. If the set of challenge inputs represents a binary string of 1's and 0's, the PUF device can set the MRAM cells of the pair of delay paths to high resistance states and low resistance states by storing the representation of the set of challenge inputs into the MRAM cells of the pair of delay paths.

If challenge inputs having an equal number of 1's and 0's are applied to both of the delay paths, the MRAM cells of each of the pair of delay paths have an equal number of MRAM cells in a high resistance state and an equal number of MRAM cells in a low resistance state. However, due to manufacturing variances, MRAM cells in a high resistance state may each have slightly varying resistive values compared with other MRAM cells in a high resistance state. Similarly, MRAM cells in a low resistance state may also each have slightly varying resistive values compared with other MRAM cells in a low resistance state. As such, the variances in resistive values of the MRAM cells may produce differing propagation delays between the pair of delay paths even if the delay paths have the same number of MRAM cells in a high resistance state and the same number of MRAM cells in a low resistance state.

By utilizing variations in MRAM cells to create a PUF delay circuit instead of utilizing transistors and gates to create threshold voltage variations, the PUF device disclosed herein may be physically compact and may be placed above critical transistor functions of the corresponding electrical circuit. Furthermore, it may be relatively more difficult to reverse engineer the PUF device disclosed herein via visual inspection compared with PUF devices that utilize techniques such as metal line variation.

FIG. 1 is a block diagram illustrating example system 10 in which example PUF device 2 may be configured to authenticate and identify example electrical circuit 4. As shown in FIG. 1, system 10 includes electrical circuit 4, such as an integrated circuit, which may include physically uncloneable function (PUF) device 2 that identifies and authenticates electrical circuit 4 for secure computing applications by producing a unique set of challenge-response pairs for electrical circuit 4. PUF device 2 may be disposed over at least a portion of circuit 4, to protect a specific area of electrical circuit 4 or to protect one or more components in electrical circuit 4.

Electrical circuit 4 may be an integrated circuit, microchip, semiconductor device, field programmable gate array (FPGA), or any other suitable interconnection of electrical components. PUF device 2 may be an integrated circuit, electrical circuit, physical system, or any other suitable set of hardware devices that is attached to, embedded in, or otherwise operably coupled to electrical circuit 4, such that PUF device 2 may, in response to receiving a challenge value, perform a physically uncloneable function to output a response. The physically uncloneable function performed by PUF device 2 may be based at least in part on the physical device characteristics of PUF device 2, such that fluctuations and variations in the physical device characteristics of the components making up PUF device 2 may enable PUF device 2 to produce a unique, repeatable, and unpredictable response to the challenge value. In some examples, PUF device 2 may physically shield areas and/or components of electrical circuit 4, such that PUF device 2 may force potential attackers to physically alter and/or destroy PUF device 2 in order to access the shielded areas and/or components of electrical circuit 4.

To determine the challenge-response pairs generated by PUF device 2, signal unit 3 and validation unit 12 may be operably coupled to PUF device 2. Validation unit 12 may be configured to output one or more challenge values 6 to PUF device 2. In some examples, one or more challenge values 6 may include a sequence of bits. Upon validation unit 12 outputting each of the one or more challenge values 6 to PUF device 2, signal unit 3 may output signal 5 to PUF device 2. Signal 5 outputted by signal unit 3 may be a digital signal, an analog signal, and the like. More specifically, signal 5 may be a rising edge signal. In some examples, validation unit 12 may integrate or otherwise include signal unit 3. Based at least upon the propagation delay of signal 5 through one or more delay paths of PUF device 2, PUF device 2 may output response value 8, which may represent one or more bits. It should be understood that validation unit 12 outputting challenge values 6 is necessarily tied to signal unit 3 outputting signal 5. While signal unit 3 may output signal 5 after validation unit 12 outputs challenge values 6, validation 12 outputting challenge value 6 may not necessarily trigger or otherwise cause signal unit 3 to output signal 5. For example, a user of validation unit 12 may turn on a functionality of validation unit 12 that outputs challenge values 6 and, subsequently, the user may turn on a functionality of signal unit 3 that outputs signal 5.

In some examples, the manufacturer of electrical circuit 4 may utilize signal unit 3 and validation unit 12 to determine a set of response values outputted by PUF device 2 in response to a set of challenge value inputs. The manufacturer may record these challenge value-response value pairs associated with PUF device 2, such as by storing the challenge value-response value pairs in its own database, in secure memory (not shown) of validation unit 12, and the like as a validated set of challenge value-response value pairs. Subsequently, electrical circuit 4 may be authenticated by utilizing signal unit 3 and validation 12 to determine a set of response values outputted by PUF device 2 in response to a set of challenge value inputs. This set of challenge value-response value pairs may be compared with the validated set of challenge value-response value pairs to authenticate electrical circuit 4. For example, if for a given challenge value, the resulting response value outputted by PUF device 2 differs from the validated response value for the challenge value, then PUF device 2 may be deemed to have been hacked or otherwise modified, and authentication may be unsuccessful for electrical circuit 4.

In some examples, electrical circuit 4 may include one or more pairs of delay chains, where each delay chain includes a plurality of MRAM cells that are configured to store challenge values 6. By storing challenge values 6, individual MRAM cells in the plurality of MRAM cells may change its resistance level. The variations in the resistance levels of the plurality of MRAM cells may cause propagation delays of signal 5. PUF device 2 may output response value 8 based at least in part on the propagation delays of signal 5 due to the plurality of MRAM cells, as discussed in more detail below with respect to FIGS. 2 and 3.

Figure 2:
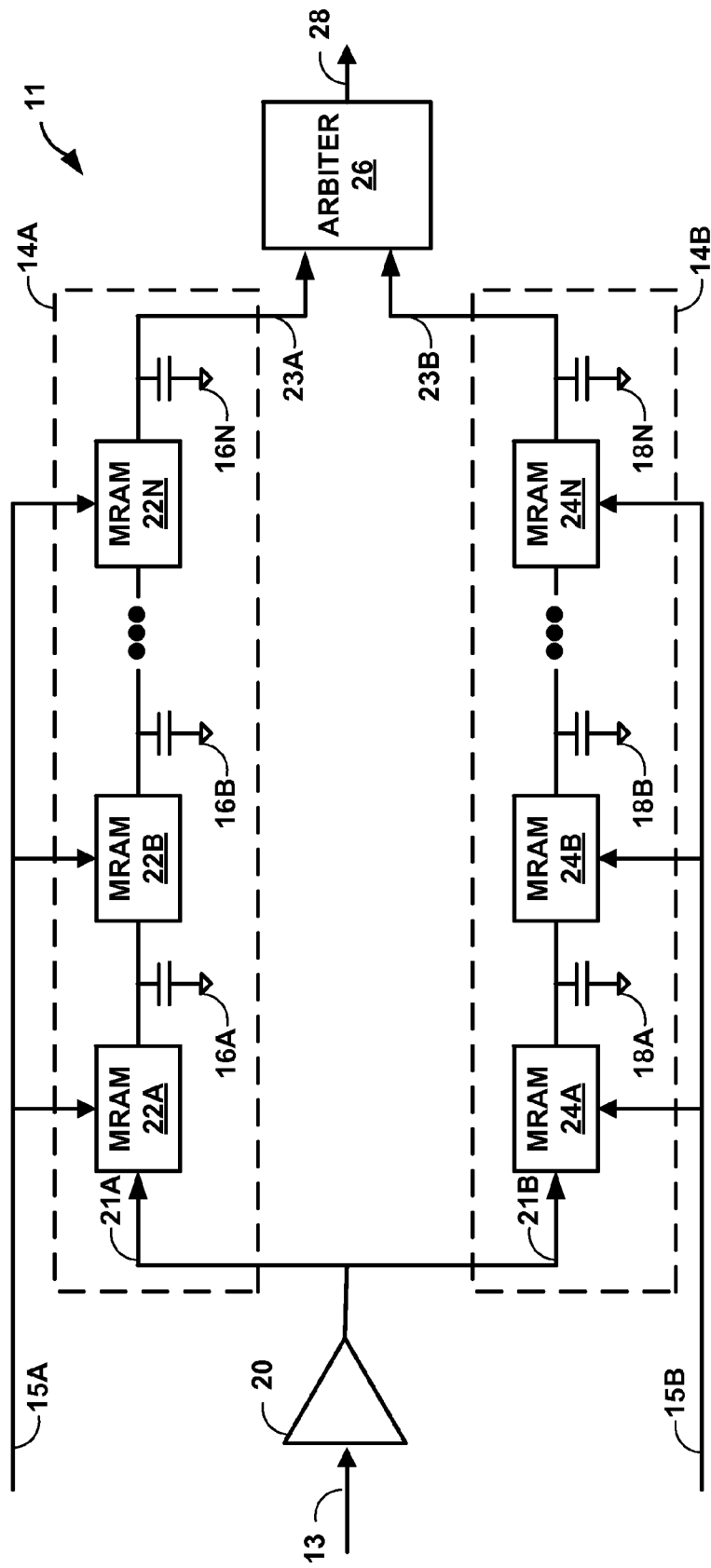
FIG. 2 is a block diagram illustrating an example delay chain which may be one example of the PUF device shown in FIG. 1.

FIG. 2 is a block diagram illustrating an example delay chain 11 which may be one example of PUF device 2 shown in FIG. 1. As shown in FIG. 2, delay chain 11 may include a pair of delay paths 14A and 14B, and arbiter 26.

Delay paths 14A and 14B may be configured to receive respective challenge values 15A and 15B from a validation unit, such as validation unit 12 shown in FIG. 1. After receiving challenge values 15A and 15B, delay paths 14A and 14B also may each be configured to receive signal 13 as respective input signals 21A and 21B, and may further be configured to propagate respective signals 21A and 21B through respective delay paths 14A and 14B to output respective output signals 23A and 23B for arbiter 26. Delay paths 14A and 14B may each introduce delays in propagating respective input signals 21A and 21B such that input signals 21A and 23B may experience different propagation delays through respective delay paths 14A and 14B. In some examples, delay paths 14A and 14B are configured to receive signal 13 as respective input signals 21A and 21B at the same time, such that one of output signals 23A and 23B arrives at arbiter 26 before the other one of output signals 23A and 23B. If delay paths 14A and 14B simultaneously receives signal 13, the order of arrival of output signals 23A and 23B at arbiter 26 may depend solely upon propagation delays of respective delay paths 14A and 14B.

Arbiter 26 may be operably coupled to delay paths 14A and 14B and may be configured to output response value 28 based at least in part on a relative propagation delay of output signals 23A and 23B through respective delay paths 14A and 14B. If delay paths 14A and 14B are configured to receive signal 13 as respective input signals 21A and 21B at the same time, arbiter 26 may be configured to output response value 28 based at least in part on a relative order of arrival of first and second output signals 23A and 23B at arbiter 26. Some examples of arbiter 26 may include a latch or any other suitable hardware component. For example, arbiter 26 may be an SR latch, or may be two counters/timers configured to start responsive to signal unit 3 initiating rising edge signal 13 and configured to stop responsive to respective output signals 23A and 23B arriving at arbiter 26.

Delay path 14A may include a plurality of MRAM cells 22A-22N ("MRAM cells 22") in series and may also include one or more capacitors 16A-16N ("one or more capacitors 16") in series. MRAM cells 22 may be in series with one or more capacitors 16. In one example, if one or more capacitors 16 includes as many capacitors as MRAM cells 22A-22N, then each respective MRAM cell of MRAM cells 22 may be followed in series in delay path 14A by a respective capacitor of one or more capacitors 16. In this way, as shown in FIG. 2, MRAM cell 22A may be followed in series by capacitor 16A, which may be followed in series by MRAM cell 22B, which may be followed in series by capacitor 16B, and so on, such that at the end of delay path 14A MRAM cell 22N is followed in series by capacitor 16N. In some examples, one or more capacitors 16 may include a single capacitor for delay path 14A, or one or more capacitors 16 may include up to as many capacitors as there are MRAM cells 22 in delay path 14A. In one example, one or more capacitors 16 may include half as many capacitors as there are MRAM cells 22, such that two MRAM cells of MRAM cells 22 in series may be followed in series by a capacitor of capacitors 16, which may be followed in series by two more MRAM cells of MRAM cells 22 in series followed in series by another capacitor of capacitors 16, and so on. As such, any suitable arrangements of MRAM cells 22 and one or more capacitors 16 in series are contemplated for delaying signal 13.

Similarly, delay path 14B may include a plurality of MRAM cells 24A-24N ("MRAM cells 24") in series and may also include one or more capacitors 18A-18N "one or more capacitors 18") in series. MRAM cells 24 may be in series with one or more capacitors 18. In one example, if one or more capacitors 16 includes as many capacitors as MRAM cells 24A-24N, then each MRAM cell of the MRAM cells 24 may be followed in series in delay path 14B by a capacitor of one or more capacitors 18. In this way, as shown in FIG. 2, MRAM cell 24A may be followed in series by capacitor 18A, which may be followed in series by MRAM cell 24B, which may be followed in series by capacitor 18B, and so on, such that at the end of delay path 14B MRAM cell 24N is followed in series by capacitor 18N. In some examples, one or more capacitors 18 may include a single capacitor for delay path 14B, or one or more capacitors 18 may include up to as many capacitors as there are MRAM cells 24 in delay path 14B.

Delay paths 14A and 14B may be configured to receive respective challenge values 15A and 15B, which may be similar to challenge value 6 shown in FIG. 1. Challenge values 15A and 15B may each represent a sequence of bits, and each bit in the sequence of bits may represent one of: 0 and 1. As such, challenge values 15A and 15B may each represent a binary sequence of 1's and 0's. In some examples, challenge values 15A and 15B may be the same, such that the sequence of bits represented by challenge value 15A may be the same as the sequence of bits represented by challenge value 15B. If challenge values 15A and 15B are the same, delay chain 11 may receive a single signal that carries a single challenge value that is applied to delay paths 14A and 14B as challenge values 15A and 15B. In some examples, challenge values 15A and 15B may be different, such that the sequence of bits represented by challenge value 15A is different from the sequence of bits represented by challenge value 15B. In some examples, the total number of 1's in challenge value 15A is the same as the total number of 1's in challenge value 15B. In other examples, the total number of 1's in challenge value 15A is different than the total number of 1's in challenge value 15B. In either case, the length of the sequence of bits represented by challenge value 15A may be the same as the sequence of bits represented by challenge value 15B, such that the sequences of bits contain an equivalent number of bits.

Delay path 14A may store the sequence of bits represented by challenge value 15A into MRAM cells 22, and delay path 14B may store the sequence of bits represented by challenge value 15B into MRAM cells 24. Each MRAM cell of MRAM cells 22 may store one or more bits of the sequence of bits represented by challenge value 15A in order, such that MRAM cell 22A may store the sequentially first bit in the sequence of bits represented by challenge value 15A, MRAM cell 22B may store the sequentially second bit in the sequence of bits represented by challenge value 15A, and the like. For example, given a sequence of bits of "10 . . . 0" represented by challenge value 15A, MRAM cell 22A may store a representation of a '1' bit, MRAM cell 22B may store a representation of a '0' bit, and MRAM cell 22N may store a representation of a '0' bit.

Similarly, each MRAM cell of MRAM cells 24 may store one bit of the sequence of bits represented by challenge value 15B in order, such that MRAM cell 24A may store the sequentially first bit in the sequence of bits represented by challenge value 15B, MRAM cell 24B may store the sequentially second bit in the sequence of bits represented by challenge value 15B, and the like. For example, given a sequence of bits of "01 . . . 0" represented by challenge value 15B, MRAM cell 24A may store a representation of a '0' bit, MRAM cell 24B may store a representation of a '1' bit, and MRAM cell 24N may store a representation of a '0' bit.

Each MRAM cell of MRAM cells 22 and 24 may be toggled to a high resistance state or a low resistance state based at least in part on respective challenge values 15A and 15B received by delay paths 14A and 14B. In one example, a high resistance state for a MRAM cell may be about 13 kilo-ohms while a low resistance state for a MRAM cell may be about 10 kilo-ohms. For example, a MRAM cell of MRAM cells 22 or 24 may be toggled to a high resistance state to store a '1' bit and may be toggled to a low resistance state to store a '0' bit. As such, MRAM cells 22 and 24 may each be toggled to a sequence of high resistance and low resistance states based on respective challenge values 15A and 15B. In some examples, first and second challenge values 15A and 15B may represent respective sequences of bits that have an equivalent number of bits that represent a 1. For example, first and second challenge values 15A and 15B may represent respective sequences of bits that each have four '1' bits. As such, MRAM cells 22 and 24 may have an equal number of MRAM cells that are set to a high resistance state and an equal number of MRAM cells that are set to a low resistance state. If first and second challenge values 15A and 15B represent the same sequence of bits. MRAM cells 22 and 24 may have the same sequence of MRAM cells set to a high resistance state and MRAM cells set to a low resistance state. If first and second challenge values 15A and 15B represent respective sequence of bits that are not the same, the sequence of MRAM cells set to a high resistance state and MRAM cells set to a low resistance state may differ between MRAM cells 22 and MRAM cells 24, even though MRAM cells 22 and 24 may still have an equal number of MRAM cells that are set to a high resistance state and an equal number of MRAM cells that are set to a low resistance state.

Due to natural variations, such as manufacturing variations, two MRAM cells that are each toggled to a high resistance state may have slightly different resistance levels. Similarly, two MRAM cells that are each toggled to a low resistance state may also have slightly different resistance levels. Furthermore, due to natural variations, each capacitor of one or more capacitors 16 and one or more capacitors 18 may also have slightly different capacitances. Thus even if MRAM cells 22 and MRAM cells 24 both have the same number of MRAM cells that are toggled to a high resistance state and the same number of MRAM cells that are toggled to a low resistance state, the time required for input signal 21A to propagate through delay path 14A to be output as output signal 23A for arbiter 26 may differ from the time required for input signal 21B to propagate through delay path 14B to be output as output signal 23B for arbiter 26.

As such, if MRAM cells 22 and MRAM cells 24 each include a series of N MRAM cells, and if challenge values 15A and 15B always represent equivalent sequences of bits, a total of $2^N$ different sequences of bits may be used as challenge values 15A and 15B for delay chain 11. If challenge values 15A and 15B can also represent different sequences of bits, more than $2^N$ different sequence of bits may be used as challenge values 15A and 15B for delay chain 11.

In some examples, FIG. 2 may also include buffer 20. Buffer 20 may be configured to receive signal 13 from a signal unit, such as signal unit 3 shown in FIG. 1. For example, buffer 20 may include one or more logic gates. Buffer 20 may be configured to amplify signal 13 and to propagate signal 13 to delay paths 14A and 14B. Signal 13 may, in some examples, be a digital signal, such as a rising edge that indicates a transition of an associated clock signal from a low state to a high state. In other examples, signal 13 may be a falling edge, a leading edge, a trailing edge, or the like.

Therefore, because challenge values 15A and 15B are stored in respective MRAM cells 22 and 24, and because individual MRAM cells of MRAM cells 22 and 24 may change its resistance values based on the value it stores, such that an MRAM cell may be of a high resistance state to store a '1' bit and a low resistance state to store a '0' bit, the values of challenge values 15A and 15B may affect the resulting signal delays for input signals 21A and 21B that form respective output signals 23A and 23B outputted to arbiter 26. Due to variations (e.g., manufacturing variations) of individual MRAM cells, there may be variations in the voltage levels of individual MRAM cells between MRAM cells that are set to the same resistance state (e.g., high resistance state or low resistance state), such that two different MRAM cells both set to the same resistance state may have varying resistance values. As such, changes in challenge values 15A and 15B may chance the amount of delay in propagating input signals 21A and 21B through delay paths 14A and 14B as output signals 23A and 23B to arbiter 26, and may affect which of output signals 23A and 23B reaches arbiter 26 first, thereby affecting response 28 outputted by arbiter 26.

Figure 3:
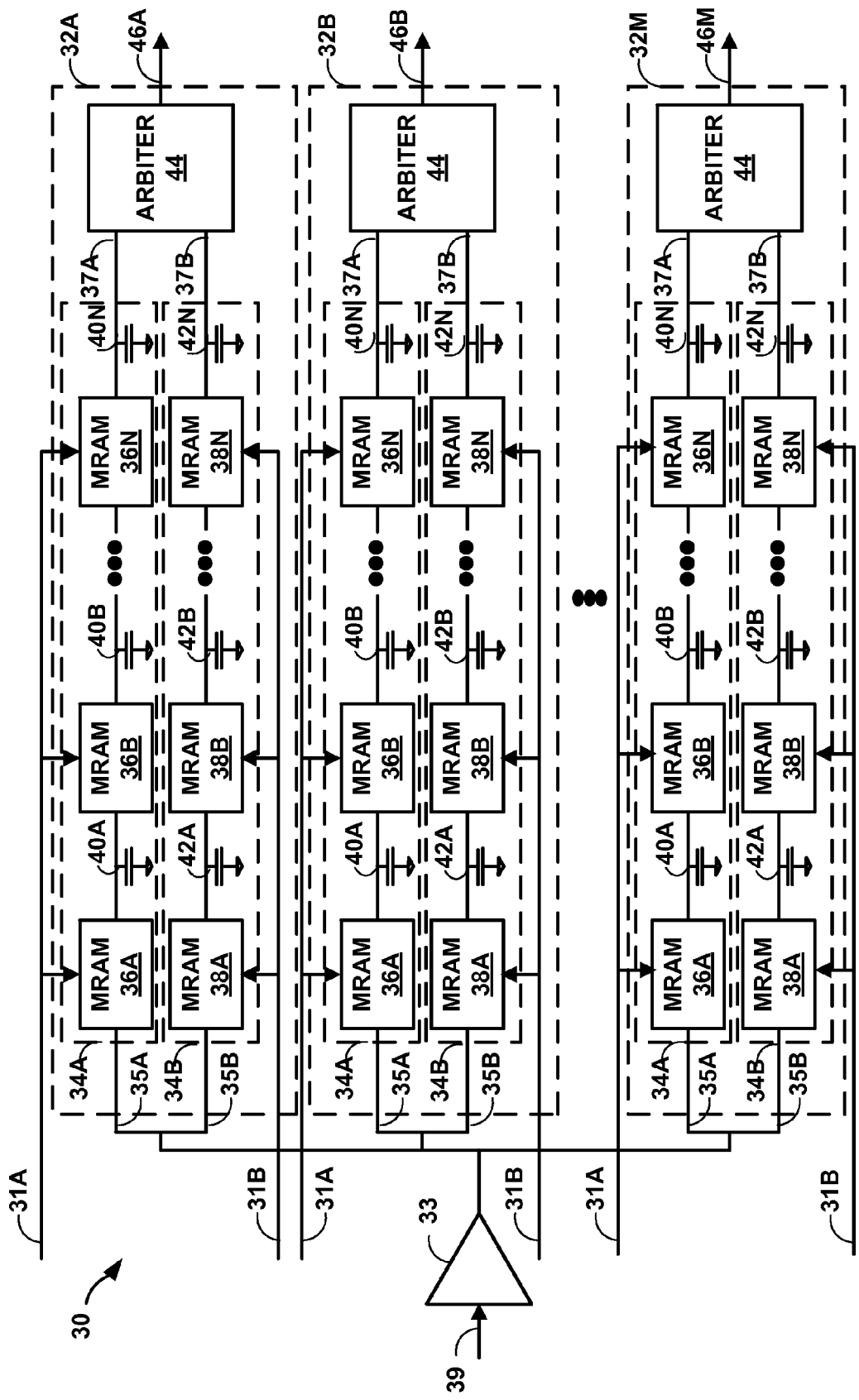
FIG. 3 is a block diagram illustrating an example delay chain array which may be one example of the PUF device of FIG. 1.

FIG. 3 is a block diagram illustrating an example delay chain array 30 which may be an example of PUF device 2 of FIG. 1. As shown in FIG. 3, delay chain array 30 may include a plurality of delay chains 32A-32M ("delay chains 32"), each of which may be similar to delay chain 11 shown in FIG. 2. For example, each of delay chains 32 may include a pair of delay paths 34A and 34B that are similar to the delay paths 14A and 14B of delay chain 11 shown in FIG. 2. Each of delay chains 32 may also include arbiter 44 that is similar to arbiter 26 of delay chain 11 shown in FIG. 2.

For each of delay chains 32, delay paths 34A and 34B may be configured to receive respective challenge values 31A and 31BB. After receiving challenge values 31A and 31B, delay paths 34A and 34B may each be configured to receive signal 39 as respective input signals 35A and 35B at the same time, and may further be configured to propagate respective signals 35A and 35B through respective delay paths 34A and 34B to output respective output signals 37A and 37B for arbiter 44. Delay paths 34A and 34B may each introduce delays in propagating respective input signals 35A and 35B such that one of output signals 37A and 37B arrives at arbiter 44 before the other one of output signals 37A and 37B. By delay paths 34A and 34B receiving signal 39 simultaneously, the order of arrival of output signals 37A and 37BB at arbiter 44 may depend solely upon propagation delays of respective delay paths 34A and 34B.

Arbiter 44 may be operably coupled to delay paths 34A and 34B and may be configured to output one of response values 46A-46M ("response values 46") based at least in part on a relative order of arrival of first and second output signals 37A and 37B at arbiter 44. Some examples of arbiter 44 may include a latch, a pair of counters/timers, or any other suitable hardware components.

Similar to delay path 14A of delay chain 11 shown in FIG. 2, delay path 34A of each of delay chains 32 may include a plurality of MRAM cells 36A-36N ("MRAM cells 36") in series and may also include one or more capacitors 40A-40N "one or more capacitors 40") in series. MRAM cells 36 may be in series with one or more capacitors 40. In one example, if one or more capacitors 40 includes as many capacitors as MRAM cells 36A-36N, then each MRAM cell of MRAM cells 36 may be followed in series in delay path 34A by a capacitor of one or more capacitors 40. In this way, as shown in FIG. 3, MRAM cell 36A may be followed in series by capacitor 40A, which may be followed in series by MRAM cell 36B, which may be followed in series by capacitor 36B, and so on, such that at the end of delay path 34A, MRAM cell 36N is followed in series by capacitor 40N. In some examples, one or more capacitors 40 may include a single capacitor for delay path 34A, or one or more capacitors 40 may include up to as many capacitors as there are MRAM cells 36 in delay path 34A.

Similar to delay path 14B of delay chain 11 shown in FIG. 2, delay path 34B of each of delay chains 32 may include a plurality of MRAM cells 38A-38N ("MRAM cells 38") in series and may also include one or more capacitors 42A-42N "one or more capacitors 42") in series. MRAM cells 38 may be in series with one or more capacitors 42. In one example, if one or more capacitors 42 includes as many capacitors as MRAM cells 38A-38N, then each MRAM cell of the MRAM cells 38 may be followed in series in delay path 34B by a capacitor of one or more capacitors 42. In this way, as shown in FIG. 3, MRAM cell 38A may be followed in series by capacitor 42A, which may be followed in series by MRAM cell 38B, which may be followed in series by capacitor 42B, and so on, such that at the end of delay path 34B MRAM cell 38N is followed in series by capacitor 42N. In some examples, one or more capacitors 42 may include a single capacitor for delay path 34B, or one or more capacitors 42 may include up to as many capacitors as there are MRAM cells 38 in delay path 34B.

For each of delay chains 32, delay paths 34A and 34B may be configured to receive respective challenge values 31A and 31B, which may be similar to challenge value 6A shown in FIG. 1. Challenge values 31A and 31B may each represent a sequence of bits, and each bit in the sequence of bits may represent one of: 0 and 1. As such, challenge values 31A and 31B may each represent a binary sequence of 1's and 0's. In some examples, challenge values 31A and 31B may be the same, such that the sequence of bits represented by challenge value 31A may be the same as the sequence of bits represented by challenge value 31B. If challenge values 31A and 31B are the same, each of delay chains 32 may receive a single signal that carries a single challenge value that is applied to delay paths 34A and 34B as challenge values 31A and 31B. In some examples, challenge values 31A and 31B may be different, such that the sequence of bits represented by challenge value 31A is different from the sequence of bits represented by challenge value 31B. In either case, the length of the sequence of bits represented by challenge value 34A may be the same as the sequence of bits represented by challenge value 31B, such that the sequence of bits contain an equivalent number of bits.

Delay path 34A may store the sequence of bits represented by challenge value 31A into MRAM cells 36, and delay path 34B may store the sequence of bits represented by challenge value 31B into MRAM cells 38. Each MRAM cell of MRAM cells 36 may store one bit of the sequence of bits represented by challenge value 31A in order, such that MRAM cell 36A may store the sequentially first bit in the sequence of bits represented by challenge value 31A, MRAM cell 36B may store the sequentially second bit in the sequence of bits represented by challenge value 31A, and the like. For example, given a sequence of bits of "10 . . . 0" represented by challenge value 31A, MRAM cell 36A may store a representation of a '1' bit, MRAM cell 36B may store a representation of a '0' bit, and MRAM cell 36N may store a representation of a '0' bit.

Similarly, each MRAM cell of MRAM cells 38 may store one bit of the sequence of bits represented by challenge value 31B in order, such that MRAM cell 38A may store the sequentially first bit in the sequence of bits represented by challenge value 31B, MRAM cell 38B may store the sequentially second bit in the sequence of bits represented by challenge value 31B, and the like. For example, given a sequence of bits of "01 . . . 0" represented by challenge value 31N, MRAM cell 38A may store a representation of a '0' bit, MRAM cell 38B may store a representation of a '1' bit, and MRAM cell 38N may store a representation of a '0' bit.

Each MRAM cells of MRAM cells 36 and 38 may be toggled to a high resistance state or a low resistance state based at least in part on respective challenge values 31A and 31B received by delay paths 34A and 34B. In one example, a high resistance state for a MRAM cell may be about 13 kilo-ohms while a low resistance state for a MRAM cell may be about 10 kilo-ohms. For example, a MRAM cell of MRAM cells 36 or 38 may be toggled to a high resistance state to store a '1' bit and may be toggled to a low resistance state to store a '0' bit. As such, MRAM cells 36 and 38 may each be toggled to a sequence of high resistance and low resistance states based on respective challenge values 31A and 31B. In some examples, first and second challenge values 31A and 31B may represent respective sequences of bits that have an equivalent number of bits that represent a 1. For example, first and second challenge values 31A and 31B may represent respective sequences of bits that each have four '1' bits. As such, MRAM cells 36 and 38 may have an equal number of MRAM cells that are set to a high resistance state and an equal number of MRAM cells that are set to a low resistance state. If first and second challenge values 31A and 31B represent the same sequence of bits. MRAM cells 36 and 38 may have the same sequence of MRAM cells set to a high resistance state and MRAM cells set to a low resistance state. If first and second challenge values 31A and 31B represent respective sequence of bits that are not the same, the sequence of MRAM cells set to a high resistance state and MRAM cells set to a low resistance state may differ between MRAM cells 36 and MRAM cells 38, even though MRAM cells 36 and 38 may still have an equal number of MRAM cells that are set to a high resistance state and an equal number of MRAM cells that are set to a low resistance state.

Furthermore, challenge values 31A and 31B may be the same or different across delay chains 32. For example, challenge value 31A may be the same across each of delay chains 32 or one or more of delay chains 32 may have different challenge value 31As. Similarly, challenge value 31A may be the same across each of delay chain 32 or one or more of delay chains 32 may have different challenge value 31Bs. As such, challenge values 31A and 31B may differ across different delay chains 32 as long as challenge values 31A and 31B within a single delay chain of delay chains 32 represent respective sequences of bits that have an equivalent number of bits that represent a 1.

In some examples, FIG. 3 may also include buffer 33. Buffer 33 may be configured to receive signal 39 from a signal unit, such as signal unit 3 shown in FIG. 1. For example, buffer 33 may include one or more logic gates. Buffer 33 may be configured to amplify signal 13 and to propagate signal 39 to delay paths 34A and 34B of each delay chain of delay chains 32. Signal 39 may, in some examples, be a digital signal, such as a rising edge that indicates a transition of an associated clock signal from a low state to a high state. In other examples, signal 39 may be a falling edge, a leading edge, a trailing edge, and the like.

Figure 4:
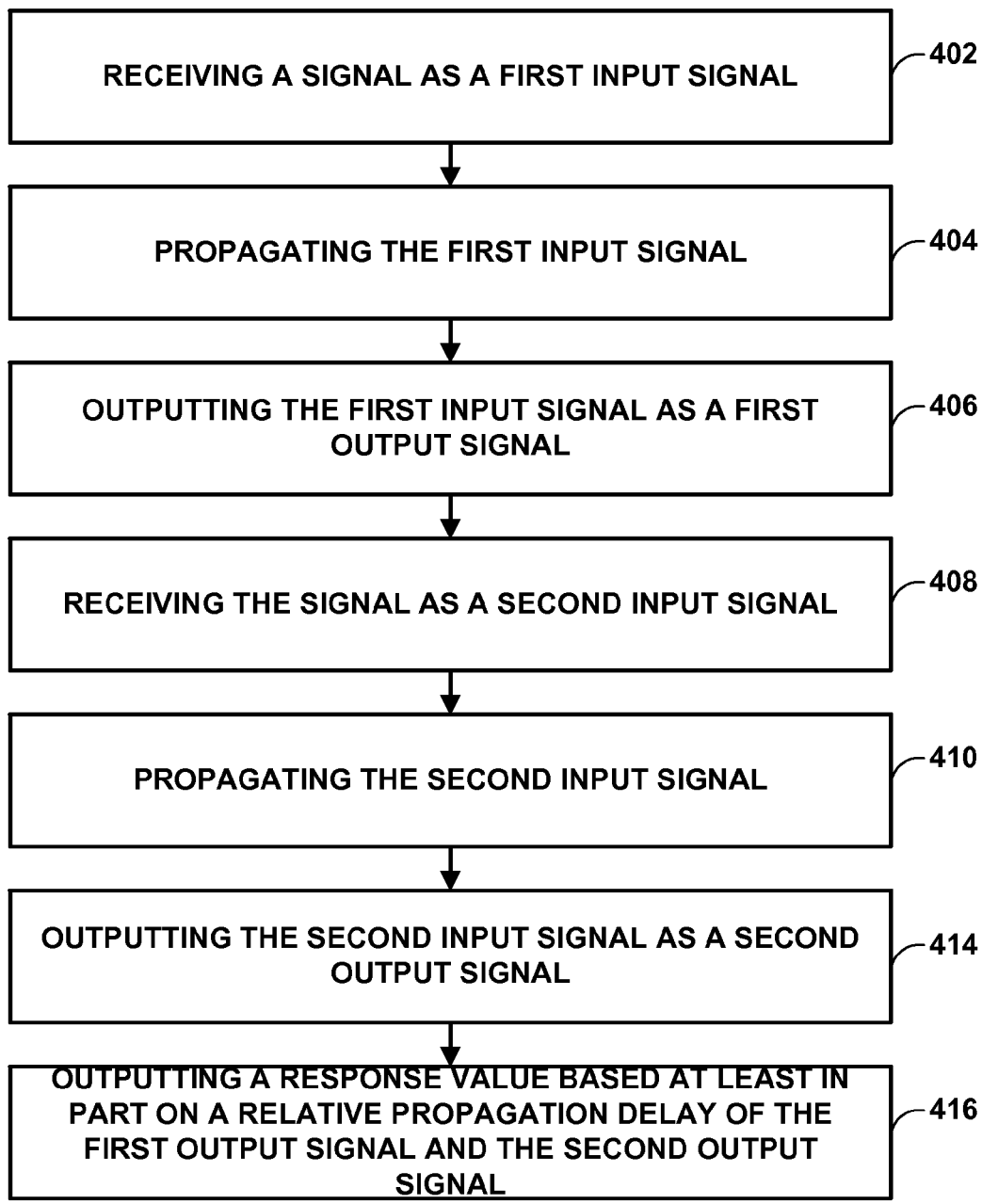
FIG. 4 is a flow diagram of an example technique for authenticating an electrical circuit based on a PUF device.

FIG. 4 is a flow diagram of an example technique for authenticating an electrical circuit based on a PUF device. While the technique shown in FIG. 4 is described with respect to delay chain 11 of FIG. 2, in other examples, the technique shown in FIG. 4 may be implemented by system 10 of FIG. 1, delay chain array 30 of FIG. 3, or the like.

In the technique shown in FIG. 4, delay path 14A may include MRAM cells 22 in series and may receive signal 13 as input signal 21A (402). Delay path 14A may further propagate input signal 21A along MRAM cells 22 (404). Delay path 14A may further output the propagated input signal 21A as output signal 23A for arbiter 26 (406). Delay path 14B may include MRAM cells 24 in series and may receive signal 13 as input signal (408). Delay path 14B may further propagate input signal 21B along MRAM cells 24 (410). Delay path 14B may further output the propagated input signal 21B as output signal 23B for arbiter 26 (412). Arbiter 26 may be operably coupled to delay path 14A and delay path 14B and may output response value 28 based at least in part on a relative propagation delay of output signal 23A and output signal 23B (414).

In some examples, delay path 14A may receive challenge value 15A and may store challenge value 15A in MRAM cells 22. Delay path 14B may receive challenge value 15B and may store challenge value 15B in MRAM cells 24. In some examples, challenge value 15A may represent a first sequence of bits, challenge value 15B may represent a second sequence of bits, each bit in the first sequence of bits and the second sequence of bits may represent one of: 0 and 1, and the first sequence of bits and the second sequence of bits may be of an equivalent length. In some examples, the first sequence of bits and the second sequence of bits may have an equivalent number of bits that represent a 1. In some examples, the first sequence of bits may be the same as the second sequence of bits. In some examples, the first sequence of bits may be different from the second sequence of bits. In some examples, the input signal may be a rising edge signal. In some examples, delay path 14B may receive signal 13 as input signal 21B at the same time delay path 14A receives signal 13, and arbiter 26 may output response value 28 based at least in part on a relative order of arrival of output signal 23A and output signal 23B The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described PUF, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software.

In any such cases, the computers described herein may define a specific machine that is capable of executing the specific functions described herein. Also, the techniques could be fully implemented in one or more circuits or logic elements, which could also be considered a processor.

Various examples of the invention have been described. These and other examples are within the scope of the following claims.

What is claimed is:

1. A device comprising:
   a first delay path including a first plurality of magnetoresistive random access memory (MRAM) cells in series, wherein the first path is configured to:
   receive a first challenge value,
   store the first challenge value in the first plurality of MRAM cells to set resistance levels of the first plurality of MRAM cells,
   receive a signal as a first input signal,
   propagate the first input signal along the first plurality of MRAM cells, and
   output the propagated first input signal as a first arbiter input signal for an arbiter device; and
   a second delay path including a second plurality of MRAM cells in series, wherein the second path is configured to:
   receive a second challenge value,
   store the second challenge value in the second plurality of MRAM cells to set resistance levels of the second plurality of MRAM cells,
   receive the signal as a second input signal,
   propagate the second input signal along the second plurality of MRAM cells, and
   output the propagated second signal as a second arbiter input signal for the arbiter device;
   wherein the arbiter device is operably coupled to the first delay path and the second delay path, and wherein the arbiter device is configured to output a response value based at least in part on a relative propagation delay of the first arbiter input signal and the second arbiter input signal.

2. The device of claim 1, wherein:
   the first challenge value represents a first sequence of bits;
   the second challenge value represents a second sequence of bits;
   each bit in the first sequence of bits and the second sequence of bits represents one of: 0 and 1; and
   the first sequence of bits and the second sequence of bits are of an equivalent length.

3. The device of claim 2, wherein the first sequence of bits and the second sequence of bits have an equivalent number of bits that represent a 1.

4. The device of claim 3, wherein the first sequence of bits is the same as the second sequence of bits.

5. The device of claim 3, wherein the first sequence of bits is different from the second sequence of bits.

6. The device of claim 1, wherein:
the first delay path further comprises a first one or more capacitors in series with the first plurality of MRAM cells; and
the second delay path further comprises a second one or more capacitors in series with the first plurality of MRAM cells.

7. The device of claim 1,
wherein the second delay path is further configured to receive the signal as a second input signal at the same time as the first delay path receives the signal, and
wherein the arbiter device is further configured to output the response value based at least in part on a relative order of arrival of the first arbiter input signal and the second arbiter input signal.

8. A device comprising:
an integrated circuit;
a plurality of delay chains disposed over at least a portion of the integrated circuit, wherein each of the plurality of delay chains include a pair of delay paths, the pair of delay paths including:
a first delay path including a first plurality of magnetoresistive random access memory (MRAM) cells in series, wherein the first path is configured to:
receive a first challenge value,
store the first challenge value in the first plurality of MRAM cells to set resistance levels of the first plurality of MRAM cells,
receive a signal as a first input signal,
propagate the first input signal along the first plurality of MRAM cells, and
output the propagated first input signal as a first arbiter input signal for an arbiter device, and
a second delay path including a second plurality of MRAM cells in series, wherein the second path is configured to:
receive a second challenge value,
store the second challenge value in the second plurality of MRAM cells to set resistance levels of the second plurality of MRAM cells,
receive the signal as a second input signal,
propagate the second input signal along the second plurality of MRAM cells, and
output the propagated second input signal as a second arbiter input signal for the arbiter device,
wherein the arbiter device is operably coupled to the first delay path and the second delay path, and wherein the arbiter device is configured to output an output value based at least in part on a relative propagation delay of the first arbiter input signal and the second arbiter input signal.

9. The device of claim 8, wherein:
the first challenge value represents a first sequence of bits;
the second challenge value represents a second sequence of bits;
each bit in the first sequence of bits and the second sequence of bits represents one of: 0 and 1; and
the first sequence of bits and the second sequence of bits are of an equivalent length.

10. The device of claim 9, wherein the first sequence of bits and the second sequence of bits have an equivalent number of bits that represent a 1.

11. The device of claim 8, wherein:
wherein the second delay path is further configured to receive the signal as a second input signal at the same time as the first delay path receives the signal, and
wherein the arbiter device is further configured to output the response value based at least in part on a relative order of arrival of the first arbiter input signal and the second arbiter input signal.

12. A method comprising:
receiving, by a first delay path including a first plurality of magnetoresistive random access memory (MRAM) cells in series, a signal as a first input signal;
receiving, by the first delay path, a first challenge value;
storing, by the first delay path, the first challenge value in the first plurality of MRAM cells to set resistance levels of the first plurality of MRAM cells;
propagating, by the first delay path, the first input signal along the first plurality of MRAM cells;
outputting, by the first delay path, the propagated first input signal as a first arbiter input signal for an arbiter device;
receiving, by a second delay path including a second plurality of MRAM cells in series, the signal as a second input signal;
receiving, by the second delay path, a second challenge value;
storing, by the second delay path, the second challenge value in the second plurality of MRAM cells to set resistance levels of the second plurality of MRAM cells;
propagating, by the second delay path, the second input signal along the second plurality of MRAM cells;
outputting, by the second delay path, the propagated second input signal as a second arbiter input signal for the arbiter device; and
outputting, by the arbiter device operably coupled to the first delay path and the second delay path, an output value based at least in part on a relative propagation delay of the first arbiter input signal and the second arbiter input signal.

13. The method of claim 12, wherein:
the first challenge value represents a first sequence of bits;
the second challenge value represents a second sequence of bits;
each bit in the first sequence of bits and the second sequence of bits represents one of: 0 and 1; and
the first sequence of bits and the second sequence of bits are of an equivalent length.

14. The method of claim 13, wherein the first sequence of bits and the second sequence of bits have an equivalent number of bits that represent a 1.

15. The method of claim 14, wherein the first sequence of bits is the same as the second sequence of bits.

16. The method of claim 14, wherein the first sequence of bits is different from the second sequence of bits.

17. The method of claim 12,
wherein receiving by the second delay path including the second plurality of MRAM cells in series, the signal as the second input signal further comprises receiving, by the second delay path, the signal as the second input signal at the same time as the first delay path receives the signal, and
wherein outputting, by the arbiter device operably coupled to the first delay path and the second delay path, the output value based at least in part on the relative propagation delay of the first arbiter input signal and the second arbiter input signal further comprises outputting, by the arbiter device, the response value based at least in part on a relative order of arrival of the first arbiter input signal and the second arbiter input signal.

\* \* \* \* \*